US006973127B1

(12) United States Patent
Kolesnik et al.

(10) Patent No.: US 6,973,127 B1
(45) Date of Patent: Dec. 6, 2005

(54) APPARATUS AND METHOD FOR MEMORY SAVING WAVELET BASED VIDEO CODING

(75) Inventors: Victor D. Kolesnik, St. Petersburg (RU); Irina E. Bocharova, St. Petersburg (RU); Boris D. Kudryashov, St. Petersburg (RU); Andrey Marsavin, St. Petersburg (RU); Victor Simileysky, Saukt Petersburg (RU); Felix A. Taubin, Saukt Petersburg (RU)

(73) Assignee: XVD Corporation, Fremont, CA (US)

( * ) Notice: Subject to any disclaimer, the term of this patent is extended or adjusted under 35 U.S.C. 154(b) by 931 days.

(21) Appl. No.: 09/648,988

(22) Filed: Aug. 25, 2000

Related U.S. Application Data

(60) Provisional application No. 60/171,890, filed on Dec. 23, 1999.

(51) Int. Cl.[7] .............................................. H04N 7/12
(52) U.S. Cl. .............................................. 375/240.11
(58) Field of Search ...................... 375/240.01, 240.11, 375/240.29; 382/240, 263; 708/400; H04N 7/12

(56) References Cited

U.S. PATENT DOCUMENTS

| | | | | |
|---|---|---|---|---|
| 5,315,670 A | * | 5/1994 | Shapiro | 382/240 |
| 5,347,479 A | * | 9/1994 | Miyazaki | 708/400 |
| 5,799,112 A | * | 8/1998 | de Queiroz et al. | 382/263 |
| 5,838,377 A | * | 11/1998 | Greene | 375/240.11 |

OTHER PUBLICATIONS

Jerome M. Shapiro, "Embedded Image Coding Using Zerotree of Wavelet Coefficients", IEEE Transactions on Signal Processing, vol. 41, No. 12, Dec. 1993.

Christos Chrysafis and Antonio Ortega, "Line Based, Reduced Memory, Wavelet Image Compression" DCC, Data Compression Conference, Mar. 30-Apr. 1, 1998, Snowbird, UT.

Robert G. Gallager and David C. Van Voorhis, "Optimal Source Codes for Geometrically Distributed Integer Alphabets", IEEE Transactions on Information Theory, vol. IT-21, pp. 228-230, Mar., 1975.

Irina Bocharova, et al., "Two-Dimensional Hierarchial Quantizing and Coding For Wavelet Image Compression", ISCPAT, Sep. 14-17, 1997, San Diego, CA, USA.

* cited by examiner

*Primary Examiner*—Young Lee
(74) *Attorney, Agent, or Firm*—Blakely, Sokoloff, Taylor & Zafman LLP

(57) ABSTRACT

A method and apparatus for compressing video signals. The video compression may include row by row horizontal subband filtering of video data representing part of an image, and row by row concurrent vertical high and vertical low pass subband filtering of the results of the horizontal subband filtering. Less than the vertical filter length of rows of results of the horizontal subband filtering may be buffered at a time. The vertical high and vertical low pass subband filtering may include calculating a first result row by adding a first row of a recursion buffer to the results of multiplying a row of results from the horizontal subband filtering and a first vertical filter coefficient, calculating a second result row by adding the first row of the recursion buffer to the result of multiplying the row of results of the horizontal subband filtering and a second vertical filter coefficient, overwriting the first row of the recursion buffer with the second result row, and transmitting the first result row to be encoded.

24 Claims, 12 Drawing Sheets

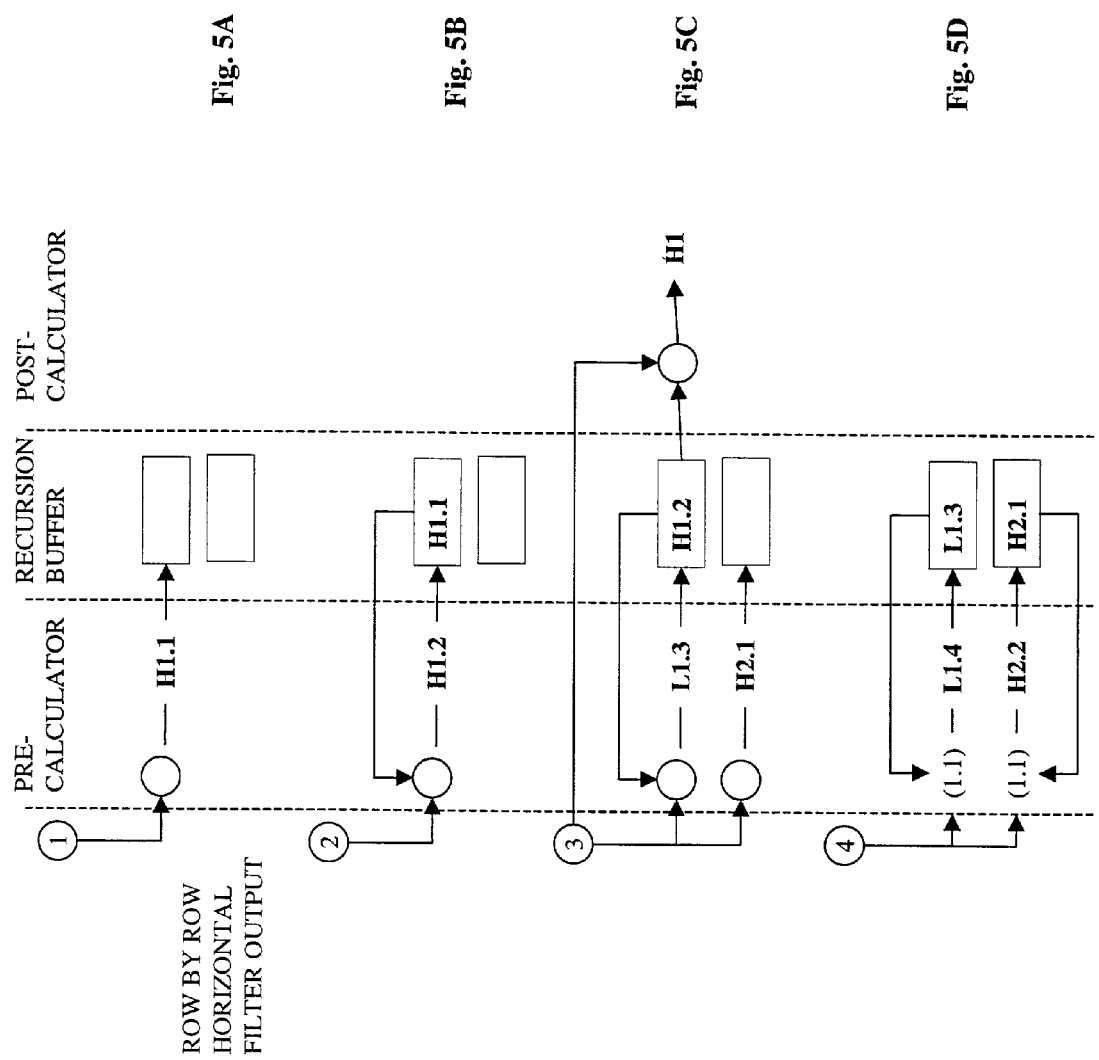

APPARATUS AND METHOD FOR MEMORY SAVING WAVELET BASED VIDEO CODING

NOTICE OF RELATED APPLICATION

This application claims the benefit of U.S. Provisional patent application No. 60/171,890, entitled "Apparatus And Method For Memory Saving Wavelet Based Image/Video Coding", filed Dec. 23, 1999.

BACKGROUND OF THE INVENTION

1. Field of the Invention

The present invention relates to an apparatus and method of compressing a video signal. More particularly, an apparatus and method of compressing a video signal with wavelet transforms and encoding.

2. Background of the Invention

Image compression systems are useful to represent video information as accurately as possible with a minimum number of bits and thus minimize the amount of data which must be stored or transmitted. The number of bits needed to store a typical image is substantially large, therefore limiting the use of images in data processing and communication systems. For example, normal consumer-quality analog telephone lines are limited to a digital communication rate of 33600 bits per second. Hence, the transmission of single 240×352 truecolor image requires more than a minute without some form of image compression.

One of the goals of image transforming and coding is to provide an acceptable subjective quality of the synthesized image at low bit rates. However, the transforming and coding must also be fast enough to allow for real time implementation.

The need to reduce the data required to represent an image has led to numerous image compression methods. An image contains redundancies that are not essential to its apparent quality. Compression methods lowered the number of bits required to synthesize the image by removing redundant components.

One set of prior art compression methods are based on discrete Fourier transform (DFT) and discrete cosine transform (DCT). These transforms break down images into their sine components. Pieced back together, these components reproduce the original image. Image compression systems use DFT or DCT to break images into their sinusoidal components and save only the largest components to reduce the amount of data. However, sine waves as the basis functions have a number of disadvantages. First, the support of every sine wave is the entire image. As a result, quantization errors tend to produce aliasing errors which are subjectively unsatisfactory. Second, the computational work load to compute the DFT is of order nlogn, where n is the number of pixels in original image. To overcome this difficulty, the image is often divided into smaller subimages (blocks) which are pieced together after reconstruction. This procedure reduces the computational work load, but leads to other undesirable artifacts in the reconstructed image, such as "blocking".

The discrete wavelet transform (DWT) was recently developed as an improvement over the DFT to better represent images having sharp changes and discontinuities. It was disclosed in by Pentland et al in Proc. Data Compression Conference Apr. 8–11, 1991, Snowbird, Utah. A wavelet decomposition based on quadrature-mirror filters has been described in "Subband Image Coding", J. W. Woods ed., Kluwer Academic Publishers, 1991 and I. Daubechies, Ten Lectures on Wavelets, Society for Industrial and Applied Mathematics (SIAM): Philadelphia, Pa., 1992. The DWT has been chosen due to its flexibility in representing nonstationary image signals and its ability in adapting human visual characteristics. A wavelet transform decomposes a nonstationary signal into a set of multiscaled wavelets where each component becomes relatively more stationary and hence easier to code. Also, coding schemes and parameters can be adapted to the statistical properties of each wavelet, and hence coding each stationary component is more efficient than coding the whole nonstationary signal. In addition, the wavelet representation matches to the spatially-tuned, frequency modulated properties experienced in human vision.

The DWT is closely related to subband decomposition. In subband coding the frequency of an image signal is decomposed into a number of subbands by a bank of bandpass filters. Each subband is then translated to a baseband by downsampling and encoded separately. For reconstruction, the subband signals are decoded and up-sampled back to the original frequency band by interpolation. The signals are then summed up to give a close replica of the original signal. Given this state of the art, a typical approach used by designers of subband coding systems is to use a perfect reconstruction filter bank and then to select subband quantizers. With this technique, each subband can be encoded according to criteria that are specific to that band. In particular, the number of bits per sample in each band can be individually allocated, thereby separately controlling the reconstruction error in each band. The wavelet theory provides a systematic way to construct a set of perfect reconstruction finite impulse response (FR) filter banks with an ability to concentrate the almost full energy of video signals in low frequency band. This property reaches a relatively good tradeoff between compression ratio and distortion with little or no computational overhead.

In contrast to an orthogonal transform coding method such as DCT, the distortions at the block boundaries and fluctuations in distortion due to the blocks are less conspicuous in subband coding. This advantage of subband coding exists because the video signal is divided into components with respect to an entire picture. As a result, subband transform yields a superior subjective perception due to the absence of the "block effect", and offers more graceful image degradation at high compression ratios. These properties of DWT make it the preferred method for low bit rate video compression.

However, wavelet based image compression coders are used less often than DCT-based coders despite their typically improved performance. DCT transforms are used more often because they do not have very high memory requirements. On the contrary, wavelet transforms have comparatively high memory requirements (usually of the order of the input image size or even more than the image size). Some wavelet-based schemes (U.S. Pat. No. 5,838,377) require memory on the order of the maximum filter length times an image width (height) depending on scanning orientation of the incoming data stream.

One method of removing redundant information from the original data is based on wavelet transform followed by the hierarchical successive approximation entropy-coded quantizer incorporating zerotrees (U.S. Pat. No. 5,315,670 5/1994). The zerotree coding is based on the hypothesis that if a wavelet coefficient at a coarse scale (parent node of the tree) is insignificant with respect to a given threshold, then all wavelet coefficients of the same orientation in the same spatial location at finer scales (child nodes) are likely to be insignificant with respect to this threshold. The use of the zero-tree structure reduces the number of bits required for accurate image representation as compared to conventional scalar quantization followed by variable length coding.

To perform the wavelet hierarchical subband decomposition, the image is decomposed using times two subsampling into high horizontal-high vertical (HH, high horizontal-low vertical (HL), low horizontal-high vertical (LH), and low horizontal-low vertical (LL) frequency subbands. The LL subband is then further subsampled times two to produce another set of HH, HL, LH and LL subbands. This is done recursively to produce an array such as that illustrated in FIG. 1, where three subsampling have been used. FIG. 1 also illustrates the parent-child dependencies of the subbands. A single parent node has four child nodes corresponding to the same region in the image with times four subsampling. Each child node has four corresponding next generation child nodes with a further times four subsampling.

FIG. 2 is a flowchart for encoding a coefficient of the significance map. This figure illustrates how the zerotree based encoder implementation classifies wavelet coefficients and generates zerotrees. When coding wavelet coefficients, typically a large fraction of the bit budget when wavelet coefficients are coded must be spent on encoding the significance map, or the binary decision as to whether a coefficient has a zero or nonzero quantized value. To reduce the number of bits for significance map coding, the zero-tree method implies the following classification of wavelet coefficients. A coefficient is said to be an element of a zero-tree for the given threshold if itself and all of its descendants (children) are insignificant with respect to this threshold. An element of a zerotree is a zero-tree root if it is not the descendant of a previously found zerotree root, i.e., it is not predictably insignificant from the discovery of a zerotree root at a coarser scale. A zero-tree root is encoded with a special symbol indicating that the insignificance of the coefficients at finer scales is completely predictable. Thus the following four symbol types are used: zerotree root, isolated zero (the coefficient is insignificant but has some significant descendants), positive significant symbol and negative significant symbol.

However, constructing a zero-tree is a rather complicated procedure which does not permit "on-the-fly" wavelet filtering followed by coding due to the necessity of the preliminary wavelet coefficient analysis. Moreover the analysis time drastically increases as an image size grows. For example, an image size of 640×480 pixels and 5 subsamplings requires analysis of 307200 pixels. Another problem appears when it is necessary to reduce the memory requirements for wavelet filtering. In this case we can not use any global statistics since we have no access to the whole image or even a complete subband.

The improvement of the zero-tree based method exists. It is reported in the following reference: U.S. Pat. No. 5,412,741, 5/1995. This system reduces the number of bits for coding the significance map by use of so-called dynamic list of pixels instead of the static list used in the previous technique. The number of bits for keeping the significance map is proportional not to the input image size but to the output (compressed) image size. However it is necessary to analyze the same number of bits as in the previous technique.

There are known coding techniques more simple than the zero-tree method which have almost the same coding efficiency (for example, U.S. Pat. No. 5,748,116). The encoder analyzes data blocks in a predefined order, and stores corresponding entries identifying data blocks containing at least one non-zero value in that same order in a list of blocks. If a data block is filled entirely with zero data when processed, then it is so identified in the output data and no further processing of the data block is required. Otherwise, if the size of data block is greater than a predefined minimum block size (2×2), then the block is divided into smaller data blocks and those smaller blocks are put on the list of blocks for further processing. Finally, if the size of a data block that is being processed is the predefined minimum block size, values representing all the data items in that data block are written into the output bit stream. This method has the following drawbacks: it is efficient only for so-called sparse wavelet coefficient arrays (arrays with a small number of non-zero elements) and it requires a rather large memory for keeping wavelet coefficient arrays and their subblocks.

An effective video signal compression with an acceptable quality of synthesized video signal and a practical real time implementation with low memory requirements still remains a key problem.

BRIEF SUMMARY OF THE INVENTION

A method and apparatus for compressing video signals is described.

According to one embodiment of the invention, a wavelet decomposition method is described. In this method, each part of video data is processed separately at one time, requiring a minimal amount of buffer memory. In addition, the vertical filtering is composed of pre-calculating and post-calculating stages.

The results of the horizontal filtering enter the pre-calculator coupled to a recursion buffer that stores intermediate values of rows of subbands. The pre-calculator uses the buffer to recursively calculate the intermediate values of rows of high and low pass filtered subbands. The post-calculator calculates the final values of rows of subband (result rows) from vertical high pass and vertical low pass filtering. These final values are then transmitted from the post-calculator to the encoder. Some result rows of vertical low pass filtering can be further filtered instead of encoded.

Another embodiment of the invention includes a low-complexity coding procedure for quantized subband coefficients. This procedure represents a variable length coding scheme for a line by line compression scheme with low memory requirements. In one embodiment of the invention, an adaptive coding algorithm representing a modification of the Golomb-Galager-Van Voorhis (GGV) algorithm (R. Galager and D. Van Voorhis, "Optimal source codes for geometrically distributed integer alphabets," IEEE Trans. on Inf. Theory, vol. IT-21, pp. 228–230, March, 1975) is used.

These embodiments have the advantage of providing a lower data rate without degrading the wavelet coefficient representation accuracy and at the same time they allow hardware real-time implementation.

BRIEF DESCRIPTION OF THE DRAWINGS

FIG. 5A illustrates a part of the priming of the recursion buffer that uses the first row of results from the horizontal filtering according to one embodiment of the invention.

FIG. 5B illustrates another part of the priming of the recursion buffer that uses the second row of results from the horizontal filtering according to one embodiment of the invention.

FIG. 5C illustrates another part of the priming of the recursion buffer that uses the third row of results from the horizontal filtering, as well as the generation of the first row of result of the vertical high pass filtering, according to one embodiment of the invention.

FIG. 5D illustrates a recursive part of the vertical filtering that uses the fourth row of results from the horizontal filtering according to one embodiment of the invention.

DETAILED DESCRIPTION OF THE INVENTION

In the following description, numerous specific details are set forth to provide a thorough understanding of the invention. However, it is understood that the invention may be practiced without these specific details. In other instances, well-known structures and techniques have not been shown in detail in order not to obscure the invention.

Figure 1:
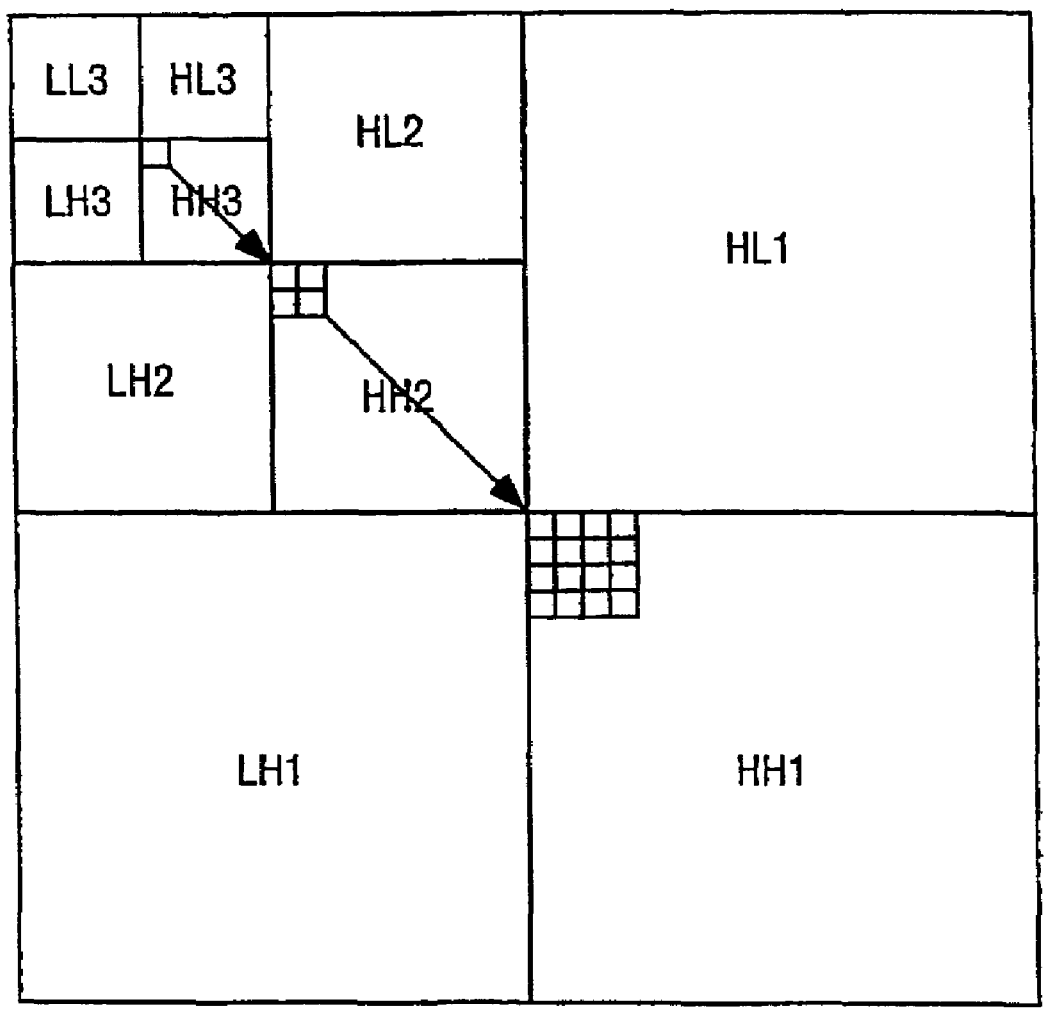
FIG. 1 illustrates wavelet hierarchical subband decomposition and parent-child dependencies of subbands.
Figure 2:
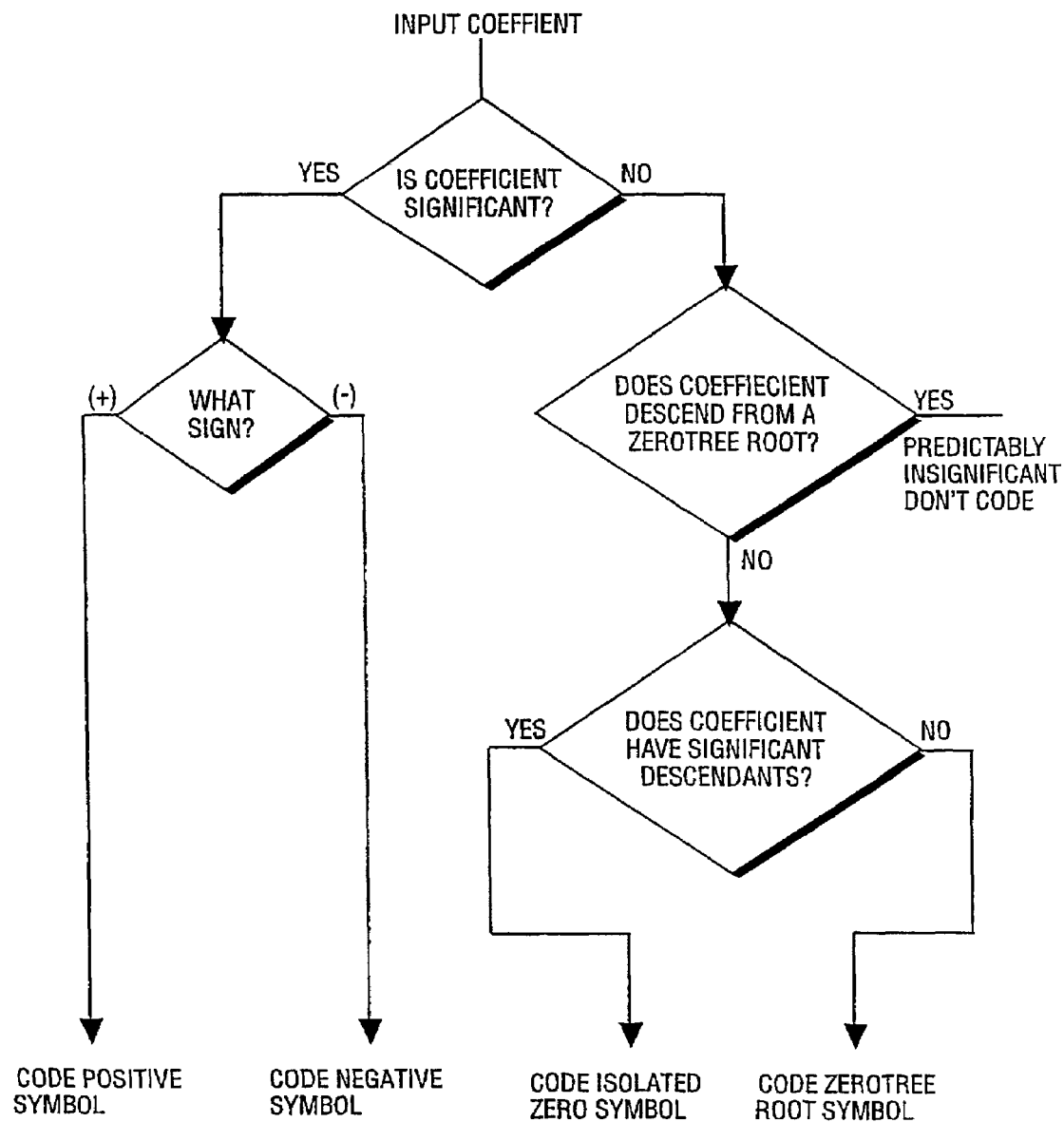
FIG. 2 is a flowchart for encoding a coefficient of the significance map.
Figure 3:
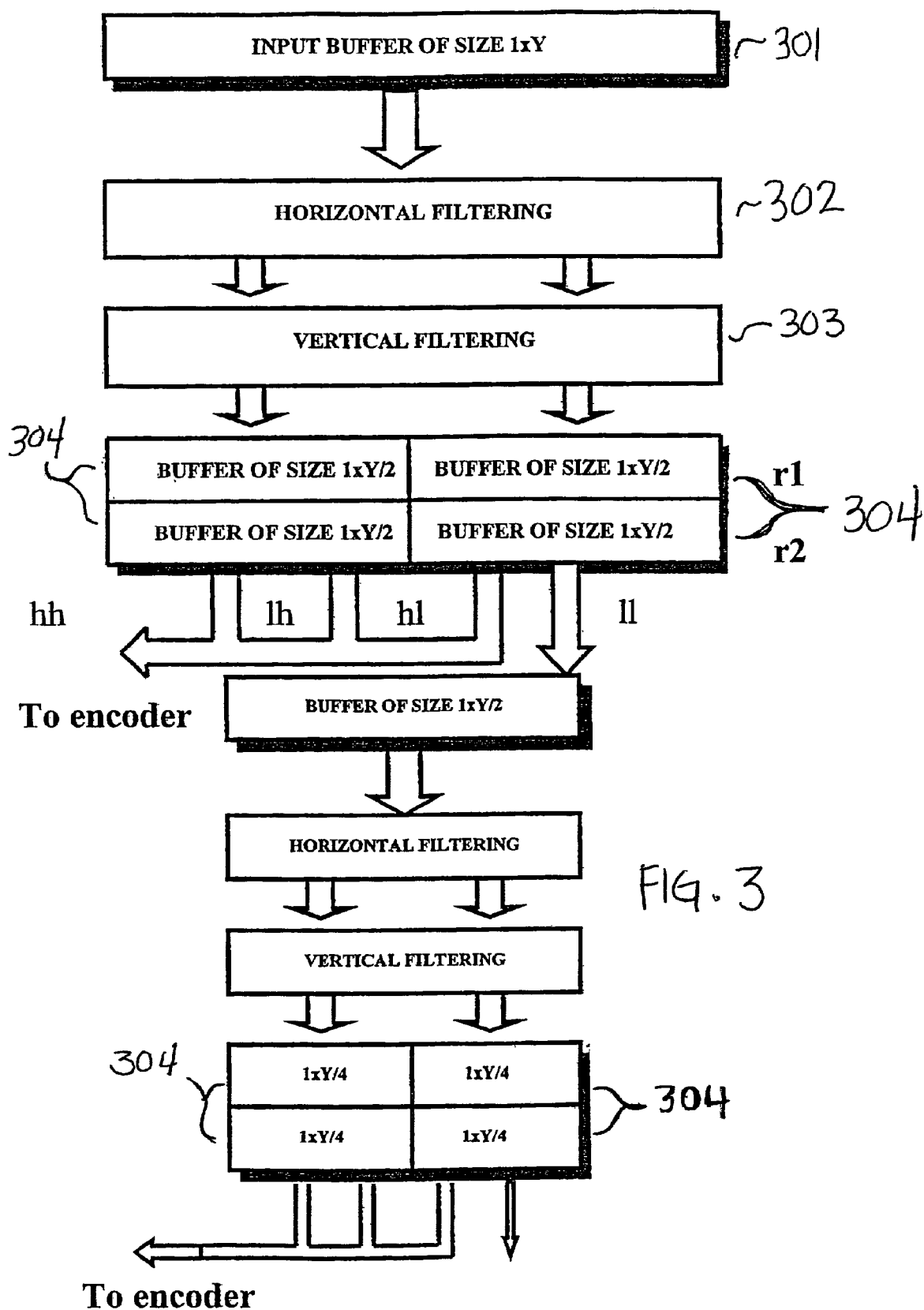
FIG. 3 is a block diagram illustrating the smaller buffer size used to save memory according to one embodiment of the invention.

FIG. 3 is a block diagram illustrating the smaller buffer size used to save memory according to one embodiment of the invention. A row of an image is buffered in an input buffer 301. The row of the image stored in the input buffer is horizontally filtered 302 and then vertically filtered 303. Each buffer 304 is only half the size of the image data received from vertical filtering and independent of the filter length. The size of the buffers decreases by half for every filtering performed.

Figure 4:
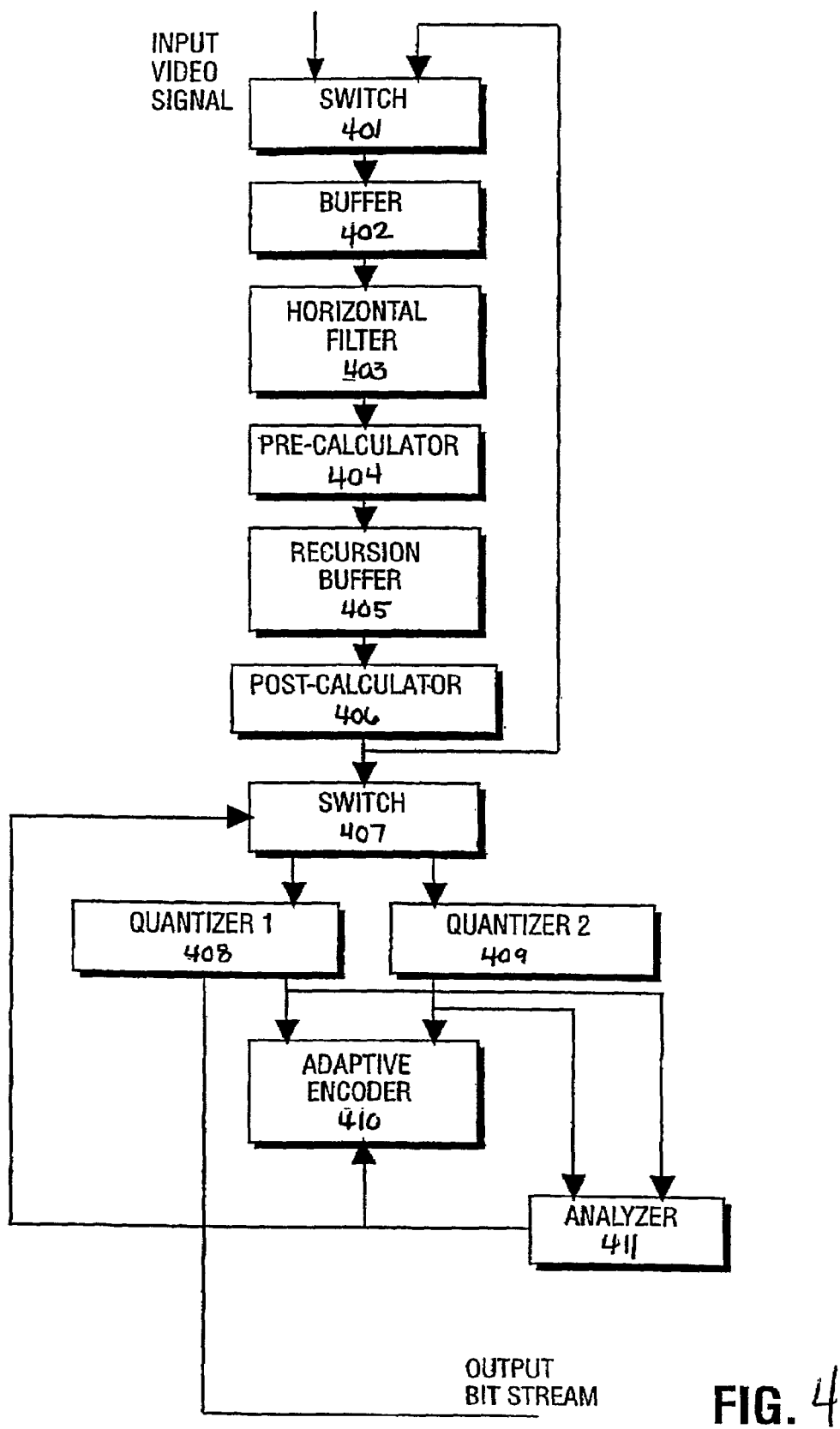
FIG. 4 is a block diagram of a video encoder 400, for still images and/or motion video according to one embodiment of the invention.

FIG. 4 is a block diagram of a video encoder 400, for still images and/or motion video according to one embodiment of the invention. The image encoder 400 includes a memory buffer 402 for temporarily keeping a part of the input video signal. The input video signal enters the buffer 402 through a switch 401. A horizontal wavelet filter 403 is applied to the output of the buffer 402 to perform horizontal subband decomposition of the input video signal.

The horizontal filtered subband coefficients are sent to the vertical filter that includes a pre-calculator 404, a recursion buffer 405, and a post-calculator 406. The pre-calculator 404 uses the horizontal filtered subband coefficients to calculate intermediate values for rows of vertical low and vertical high pass filtered subbands. These intermediate values are stored in the recursion buffer 405. Rows of vertical high and vertical low pass filtered subbands are sent from the post-calculator 406 to either the switch 401 or switch 407.

Low-low pass filtered subbands are sent to the switch 401. The low-low pass filtered subbands may enter the input buffer 402 for the next level of decomposition. Low-high, high-high and high-low pass filtered subbands and last level low-low pass filtered subband are sent to switch 407 and then quantizers 408,409.

According to one embodiment of the invention, the two following quantizers are used: a conventional uniform scalar quantizer 408 and a differential quantizer 409. The analyzer 411 classifies portions of wavelet coefficients using the number of non-zero elements in the previously quantized portion as a criterion. If this number is greater than a predetermined threshold, then the differential quantizer 409 is applied to the current wavelet coefficients. The differential quantizer 409 determines the difference between consecutive portions of wavelet coefficients or estimation errors. The scalar quantizer 308 then quantizes the estimation errors. These quantized wavelet coefficients are then sent to the encoder 410. The encoder 410 performs variable length coding of the quantized wavelet coefficients.

For a wavelet hierarchical subband decomposition, the image of size M×N pixels is decomposed using two times subsampling into high horizontal-high vertical (HH), high horizontal-low vertical (HL), low horizontal-high vertical (LH), and low horizontal-low vertical (IL) arrays of size M/2×N/2. The LL array is then further subsampled times two to provide a set of HH, HL, LH and LL arrays of size M/4×N/4 and so on. This decomposition is done recursively. In one embodiment, this decomposition is performed with 5-tap/3-tap biorthogonal filters.

In one embodiment, the size of the recursive buffer is minimized by performing horizontal filtering for a part of the video signal at a time and having the vertical filter decomposed into the pre-calculator and the post-calculator units.

FIGS. 5A–5G illustrate the use of a buffer less than the maximum filter length to store results of horizontal and vertical filtering before encoding and the swappingly storing of intermediate values of vertical high and low pass filtering in the recursion buffer over time according to one embodiment of the invention. The dashed lines in FIGS. 5A–5G separate the pre-calculator, recursion buffer and post-calculator. Paranthesis indicate equations for vertical high and low pass filtering as found in the specification below. Circled numbers represent different result rows of the horizontal filter coefficients generated at different moments in time. HX.Y indicates intermediate values for the Xth row of high pass filtering based on calculations with Y of the vertical high pass coefficients. LX.Y indicates intermediate values for the Xth row of low pass filtering based on calculations with Y of the vertical low pass coefficients. HX and LX indicate the resulting Xth row of the vertical high and low pass filtering, respectively.

FIGS. 5A–5C illustrate priming of the recursion buffer according to one embodiment of the invention. In FIGS. 5A–5C, the pre-calculator initializes the two rows of the recursion buffer across three moments of time with three different result rows from the horizontal filtering, and the post-calculator generates the first result row of vertical high pass filtering when the third result row of the horizontal filtering is received. In addition, when the third result row of the horizontal filtering is received, the first swapping between rows of the recursion buffer takes place.

Figure 5E:
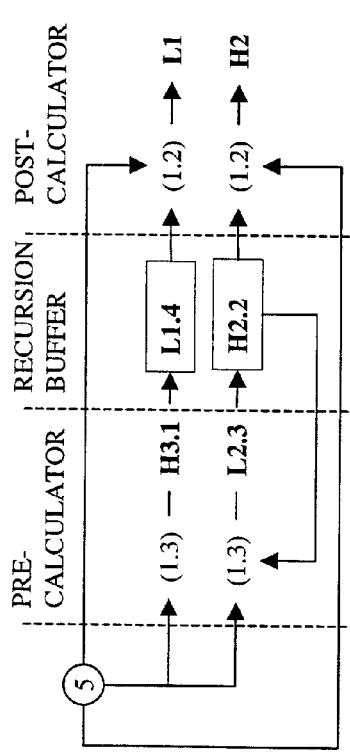
FIG. 5E illustrates another recursive part of the vertical filtering that uses the fifth row of results from the horizontal filtering according to one embodiment of the invention.
Figure 5F:
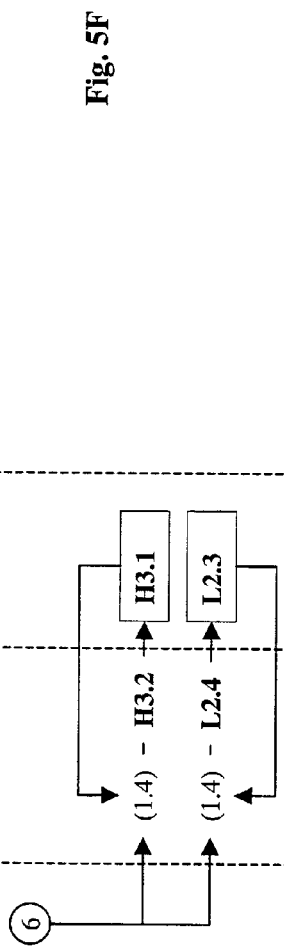
FIG. 5F illustrates another recursive part of the vertical filtering that uses the fifth row of results from the horizontal filtering according to one embodiment of the invention.
Figure 5G:
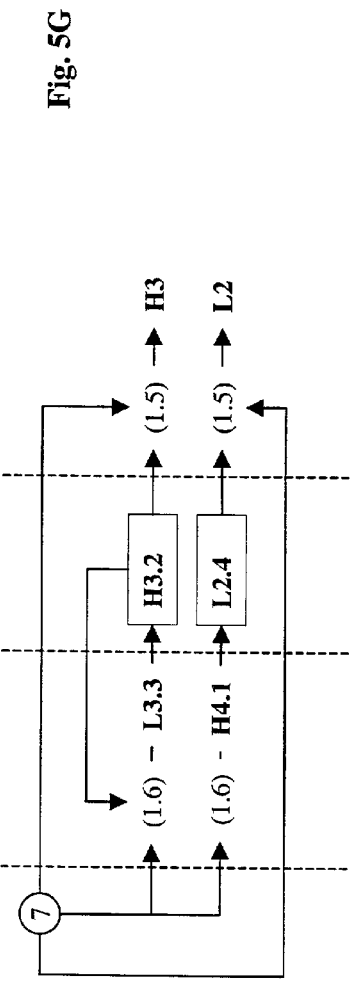
FIG. 5G illustrates another recursive part of the vertical filtering that uses the fifth row of results from the horizontal filtering according to one embodiment of the invention.

FIGS. 5D–5G illustrate the post-calculator concurrently generating staggered rows of vertical high and low pass filtering (LX is calculated while HX+I is calculated) according to one embodiment of the invention. FIGS. 5D–5G also illustrate how the intermediate values of vertical high and low pass filtering are swappingly stored in the recursion buffer. In FIGS. 5D–5E, the first row of the recursion buffer stores intermediate values for the low pass filter and the second row of the recursion buffer stores intermediate values for the high pass filter. In FIGS. 5F–5G, the first row of the recursion buffer stores intermediate values for the high pass filter and the second row of the recursion buffer stores intermediate values for the low pass filter.

Figure 6:
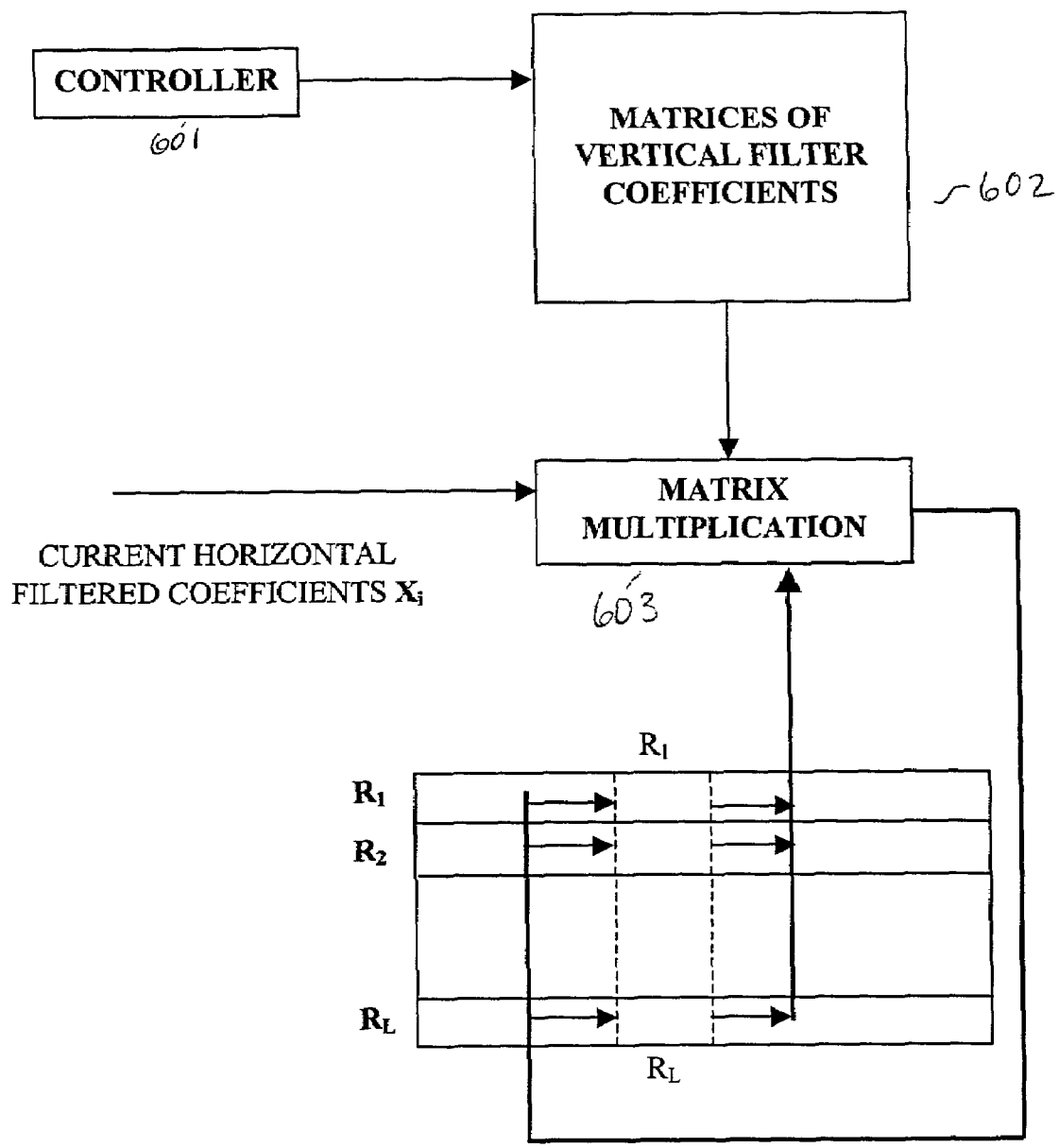
FIG. 6 is a block diagram of the pre-calculator 404 of FIG. 4 according to one embodiment of the invention.

FIG. 6 is a block diagram of the pre-calculator 404 of FIG. 4 according to one embodiment of the invention. The use of this wavelet decomposition method significantly reduces the required buffer size and provides a wavelet-based video compression technique suitable for hardware or DSP implementation which can be employed for "on-the-fly" compression of video sequences. It includes a controller 601 which selects a matrix of vertical filter coefficients from the unit 602 which is the complete matrix of vertical filter coefficients. In one embodiment the following lowpass and highpass analysis filters are used: $(-1/\sqrt{32}, 2/\sqrt{32}, 6/\sqrt{32}, 2/\sqrt{32}, -1/\sqrt{32})$ and $(-2/\sqrt{32}, 4/\sqrt{32}, -2/\sqrt{32})$. After normalization, these filters can be represented in the form: $(-1,2,6,2,-1)$ and $(-1,2,-1)$. Thus the vertical filtering can be performed with integer arithmetic with the corresponding normalization of the filtered components. The current horizontal filtered coefficient $X_{ij}$ and the corresponding column of the recursion buffer 405 $R=(R_1, R_2, \ldots, R_L)$, where L denotes a buffer height, are multiplied by the selected matrix of vertical filter coefficients in a unit 603 to obtain a new value of R.

Figure 7:
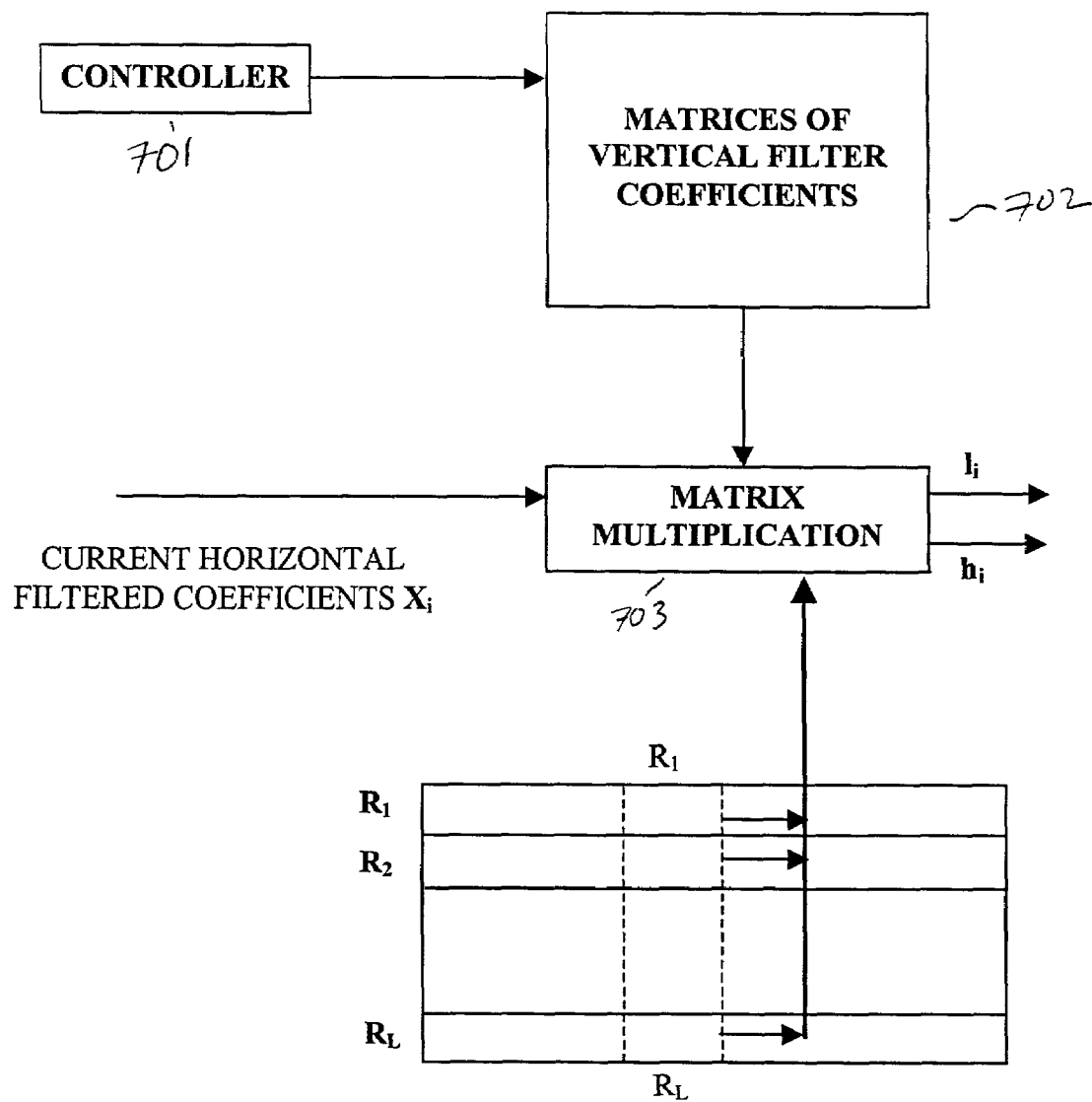
FIG. 7 is a block diagram of the post-calculator 406 of FIG. 4 according to one embodiment of the invention.

FIG. 7 is a block diagram of the post-calculator 406 of FIG. 4. In FIG. 7, a controller 701 selects a matrix of vertical filter coefficients from a unit 702. In FIG. 7, a horizontal filtered coefficient $X_{ij}$ and the corresponding column of the recursion buffer $R=(R_1, R_2, \ldots, R_L)$ are multiplied by the selected matrix of vertical filter coefficients in a unit 703 to generate new values of rows from vertical filtering.

The basic equations for lowpass and highpass analysis filters respectively are:

$$1. \ (R_1, R_2) = (X_{ij}, R_1, R_2) \begin{pmatrix} 2 & 2 \\ 1 & 0 \\ 0 & 1 \end{pmatrix}, \text{(pre-calculator)} \quad (1.1)$$

$$2. \ (l_{i/2-1,j}, h_{i/2,j}) = (X_{ij}, R_1, R_2) \begin{pmatrix} -1 & -1 \\ 1 & 0 \\ 0 & 1 \end{pmatrix}, \text{(post-calculator)} \quad (1.2)$$

$$(R_1, R_2) = (X_{ij}, R_1, R_2) \begin{pmatrix} -1 & 6 \\ 0 & 0 \\ 0 & 1 \end{pmatrix}, \text{(pre-calculator)} \quad (1.3)$$

$$3. \ (R_1, R_2) = (X_{ij}, R_1, R_2) \begin{pmatrix} 2 & 2 \\ 1 & 0 \\ 0 & 1 \end{pmatrix}, \text{(pre-calculator)} \quad (1.4)$$

$$4. \ (l_{i/2-1,j}, h_{i/2,j}) = (X_{ij}, R_1, R_2) \begin{pmatrix} -1 & -1 \\ 1 & 0 \\ 0 & 1 \end{pmatrix}, \text{(post-calculator)} \quad (1.5)$$

$$(R_1, R_2) = (X_{ij}, R_1, R_2) \begin{pmatrix} 6 & -1 \\ 1 & 0 \\ 0 & 0 \end{pmatrix}, \text{(pre-calculator).} \quad (1.6)$$

Here, i starts with 5 and increases by 1 at each step, $j=1, \ldots, Y$ for each step, where Y denotes a length of the input buffer. Italicized variables represent elements of rows.

Figure 8:
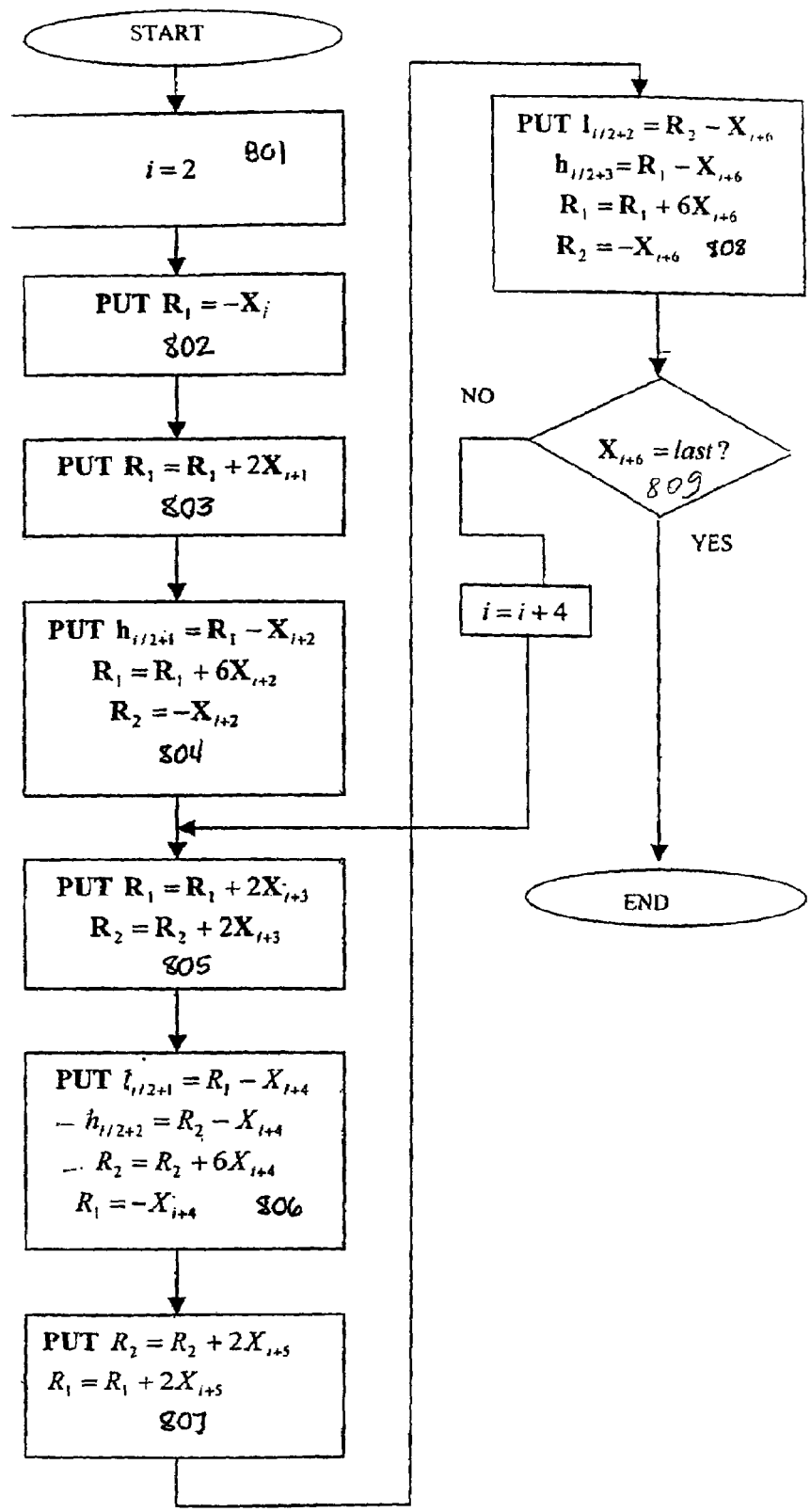
FIG. 8 is a flow chart of vertical filtering according to one embodiment of the invention.

FIG. 8 is a flowchart of vertical filtering according to one embodiment of the invention. Here $X_i$ denotes a current row of horizontal filtered subband (horizontal filtered subband coefficients), $R_1, R_2$ are rows of the same size of the recursion buffer and $l_i, h_i$ denote rows of the half size of highpass and lowpass vertical filtered subbands (vertical high and vertical low pass filtered subband coefficients). In block 801, an index variable is initialized. The initial value of $R_1$ is set in block 802 to an intermediate value of vertical filtering. The value of $R_1$ is updated in block 803 with the next row of horizontal filtered subband. A row of vertical high pass filtered subband is calculated in block 804. The value for $R_2$ is initialized with an intermediate value for the next row of vertical high pass filtered subband and $R_1$ is updated in block 804 with an intermediate value of a row of vertical low pass filtered subband. Both $R_1$ and $R_2$ are updated again in block 805 according to equation (1.1). The final value for the next row of vertical high pass filtered subband and a final value for a row of vertical low pass filtered subband is calculated in block 606 according to equation (1.2). In addition, the values for $R_1$ and $R_2$ are updated by (1.3) in block 806. Another update to the recursion buffer according to (1.4) is performed in block 807. In block 808, additional subsequent rows of vertical high pass and vertical low pass filtered subbands are calculated per (1.5) and the values for $R_1$ and $R_2$ are updated by (1.6). A switch in block 809 determines whether a row of horizontal filtered subband is the last. If so, then the decomposition of the image part is complete. Otherwise, the index variable is incremented and the process returns to block 805.

It follows from the above equations that for the chosen biorthogonal filters, the recursion buffer size needed for one level of the wavelet decomposition does not exceed 2×Y, where Y is a length of the input buffer. In the general case, to perform the wavelet decomposition with L levels it is necessary to have the recursion buffer of size $$\sum_{j=1}^{L} Y/2^{j-2} = \$Y(1-(1/2)^L).$$

This value is significantly less than the maximum filter length S times by the input buffer size $(2SY(1-(\frac{1}{2})^L)<10y$.

For the sake of completeness, the implementation of edge-mirroring is presented. In one embodiment of the invention, to eliminate boundary distortion effects a kind of boundary-compensated wavelets are used instead of applying a circular convolution method or edge-mirroring. This approach reduces required memory size and the number of arithmetic operations. In this case the equations for lowpass and highpass vertical filtering for the first four parts of samples look like the following:

1). $(R_1, R_2) = (X_{ij}, R_1, R_2)\begin{pmatrix} 2 & 0 \\ 0 & 0 \\ 0 & 0 \end{pmatrix}$ (pre-calculator)

2). $h_{1j} = (X_{2j}, R_1 R_2)\begin{pmatrix} -2 \\ 1 \\ 0 \end{pmatrix}$ (post-calculator) $(R_1, R_2) =$ $(X_{2j}, R_1, R_2)\begin{pmatrix} 5 & -1 \\ 1 & 0 \\ 0 & 0 \end{pmatrix}$ (pre-calculator)

3). $(R_1, R_2) = (X_{3j}, R_1, R_2)\begin{pmatrix} 2 & 2 \\ 1 & 0 \\ 0 & 1 \end{pmatrix}$ (pre-calculator)

4). $(h_{2j}, l_{1j}) = (X_{4j}, R_1, R_2)\begin{pmatrix} -1 & -1 \\ 0 & 1 \\ 1 & 0 \end{pmatrix}$ (post-calculator) $(R_1, R_2) =$ $(X_{4j}, R_1, R_2)\begin{pmatrix} -1 & 6 \\ 0 & 0 \\ 0 & 1 \end{pmatrix}$ (pre-calculator).

The equation for vertical lowpass filtering for the last P-th part of samples of length Y is $l_{P/2,j} = (X_{Pj}, R_1 R_2)\begin{pmatrix} 6 \\ 2 \\ 0 \end{pmatrix}$ (post-calculator).

To illustrate that the proposed wavelet filters guarantee the perfect reconstruction property, it is necessary to consider the total matrix of the vertical filtering. It has the following form:

$$T = \begin{pmatrix} 2 & 2 & 0 & 0 & 0 & 0 & \cdots & 0 & 0 & 0 & 0 & 0 \\ -2 & 5 & -1 & -1 & 0 & 0 & \cdots & 0 & 0 & 0 & 0 & 0 \\ 0 & 2 & 2 & 2 & 0 & 0 & \cdots & 0 & 0 & 0 & 0 & 0 \\ 0 & -1 & -1 & 6 & -1 & -1 & \cdots & 0 & 0 & 0 & 0 & 0 \\ 0 & 0 & 0 & 2 & 2 & 2 & \cdots & 0 & 0 & 0 & 0 & 0 \\ 0 & 0 & 0 & -1 & -1 & 6 & \cdots & -1 & 0 & 0 & 0 & 0 \\ \cdots & \cdots & \cdots & \cdots & \cdots & \cdots & \cdots & \cdots & \cdots & \cdots & \cdots & \cdots \\ 0 & 0 & 0 & 0 & 0 & -1 & \cdots & 6 & -1 & -1 & 0 & 0 \\ 0 & 0 & 0 & 0 & 0 & 0 & \cdots & 2 & 2 & 2 & 0 & 0 \\ 0 & 0 & 0 & 0 & 0 & 0 & \cdots & -1 & -1 & 6 & -1 & -2 \\ 0 & 0 & 0 & 0 & 0 & 0 & \cdots & 0 & 0 & 2 & 2 & 4 \\ 0 & 0 & 0 & 0 & 0 & 0 & \cdots & 0 & 0 & -1 & -1 & 6 \end{pmatrix},$$

where each odd column corresponds to highpass filtering and each even column corresponds to lowpass filtering. The reverse vertical filtering can be implemented by the similar manner and its matrix TI looks like $$TI = \begin{pmatrix} 6 & 2 & -2 & 0 & 0 & 0 & \cdots & 0 & 0 & 0 & 0 & 0 \\ -2 & 2 & -2 & 0 & 0 & 0 & \cdots & 0 & 0 & 0 & 0 & 0 \\ -1 & 1 & 6 & 1 & -1 & 0 & \cdots & 0 & 0 & 0 & 0 & 0 \\ 0 & 0 & -2 & 2 & -2 & 0 & \cdots & 0 & 0 & 0 & 0 & 0 \\ 0 & 0 & -1 & 1 & 6 & 1 & \cdots & 0 & 0 & 0 & 0 & 0 \\ 0 & 0 & 0 & 0 & -2 & 2 & \cdots & 0 & 0 & 0 & 0 & 0 \\ 0 & 0 & 0 & 0 & -1 & 1 & \cdots & 1 & -1 & 0 & 0 & 0 \\ \cdots & \cdots & \cdots & \cdots & \cdots & \cdots & \cdots & \cdots & \cdots & \cdots & \cdots & \cdots \\ 0 & 0 & 0 & 0 & 0 & 0 & \cdots & 1 & 6 & 1 & -1 & 0 \\ 0 & 0 & 0 & 0 & 0 & 0 & \cdots & 0 & -2 & 2 & -2 & 0 \\ 0 & 0 & 0 & 0 & 0 & 0 & \cdots & 0 & -1 & 1 & 5 & 1 \\ 0 & 0 & 0 & 0 & 0 & 0 & \cdots & 0 & 0 & 0 & -4 & 2 \end{pmatrix}.$$

It is easy to see that T×TI=I, where I denotes the identity matrix. Thus, the perfect reconstruction property is guaranteed.

The decomposed vertical filtering substantially reduces the amount of memory necessary for image compression. The invention allows "on-the-fly" vertical filtering which uses each row of the results of horizontal filtering as they are produced from the horizontal filter. Instead of storing a number of rows from the horizontal filtering equal to the maximum filter length, the vertical filter utilizes results rows from the horizontal filtering as they are generated as shown in the FIGS. 5A–5G and the flowchart in FIG. 8. The combination of "on-the-fly" vertical filtering and swapping intermediate values in the recursion buffer is a substantial improvement for wavelet based image compression.

The analyzer 411 classifies portions of wavelet coefficients using the number of non-zero elements in the previous already quantized portion as a criterion. If this number is greater than a predetermined threshold, then the differential quantizer is applied to the current portion of the wavelet coefficients. Let $W = \{w_{i,j}, \ldots K\}$ be the i-th portion of wavelet coefficients. At each step of the quantization procedure, the differential quantizer computes the difference $(w_{i,j+1}, j - w_{i,j})$, $j = 1, 2, \ldots, K-1$. For $j = 1$ it computes differences $(w_{i,j} - w_{i-1,j})$, or in other words, the quantizer uses one memory element. A uniform scalar quantizer then quantizes these differences (estimation errors). The quantized values of the estimation errors are then encoded by module 410 and put into the bit stream.

Figure 9:
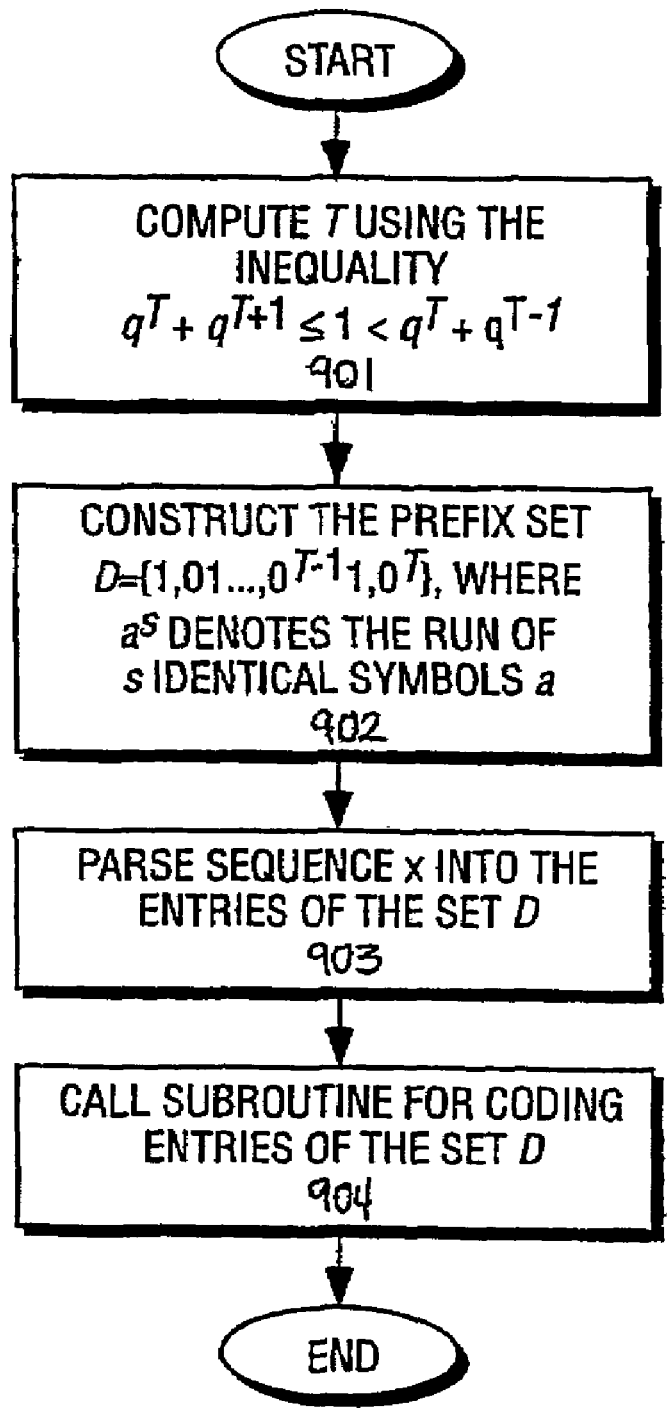
FIG. 9 is a flowchart of the GGV coding procedure according to one embodiment of the invention.

The quantized wavelet coefficients from the output of quantizers 408, 409 enter adaptive encoder 410. In one embodiment of the invention, this encoder uses a modified Golomb-Galager-Van Voorhis (GGV) method for encoding the quantized wavelet coefficients. FIG. 9 is a flowchart of the GGV coding procedure according to one embodiment of the invention. The GGV coding procedure encodes a binary source of independent identically distributed variables. Let $A = \{0, 1\}$ be a source alphabet and q and $p = 1 - q$, $p \leq \frac{1}{2}$ be the probabilities of 0 and 1 respectively. First a unique positive integer T satisfying the inequality $$q^T + q^{T+1} \leq 1 < q^T + q^{T-1} \tag{2}$$

is computed in the block 701. For T satisfying (2) the prefix set of T binary sequences $D = \{1, 01, \ldots, 0^{T-1}1, 0^T\}$, where $a^s$ denotes the run of s identical symbols a, is then constructed in the block 902. Source sequence x is parsed into the entries of D in the block 903. The procedure of variable length coding for the entries of D is then called in the block 904.

Figure 10:
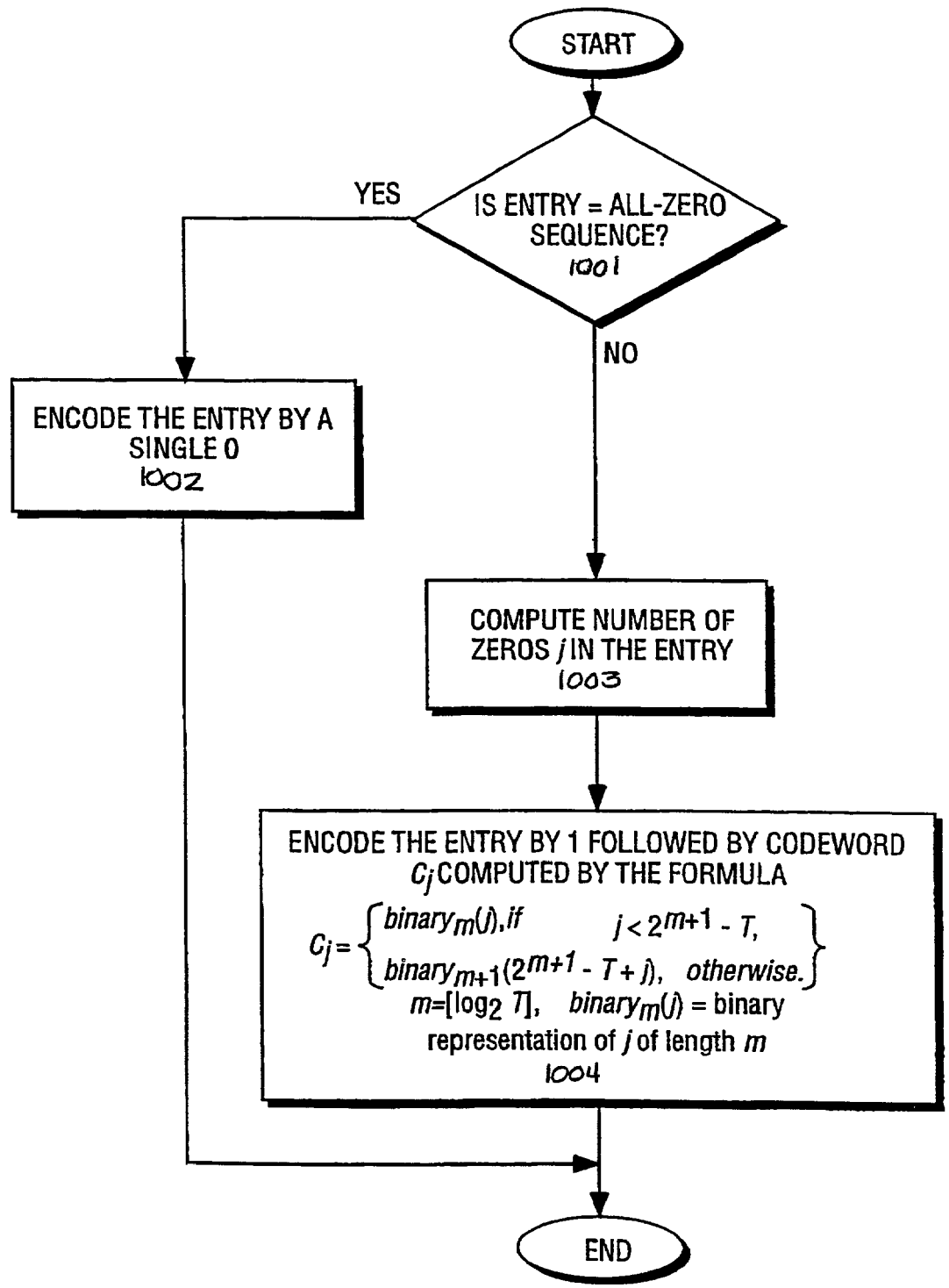
FIG. 10 is a flowchart of the coding procedure for the entries of D (block 904 of FIG. 9) according to one embodiment of the invention.

FIG. 10 is a flowchart of the coding procedure for the entries of D (block 904 of FIG. 9) according to one embodiment of the invention. In block 1001, the entry is compared with an all-zero sequence of length T. If the entry is an all-zero sequence, a single zero is put into the bit stream (block 1002). Otherwise, the number of zeros j in the entry is computed in block 1003. In block 1004 the entry is coded by 1 followed by codeword $c_j$ calculated by the formula $$c_j = \begin{cases} binary_m(j), & \text{if } j \leq 2^{m+1} - T, \\ binary_{m+1}(2^{m+1} - T + j), & \text{otherwise,} \end{cases}$$

where $m = \lfloor \log_2 T \rfloor$, $binary_m(j)$ maps an integer $j \in \{0, \ldots, 2^m - 1\}$ into the vector c of length m which is the binary representation of j.

The modified GGV algorithm (QGGV algorithm) reduces the problem of encoding a Q-ary source sequence to encoding J binary sequences, where $1 \leq J < Q$ is a predetermined number, followed by some variable rate (for example, Huffman) encoding for (Q-J)-ary residual sequence.

Figure 11:
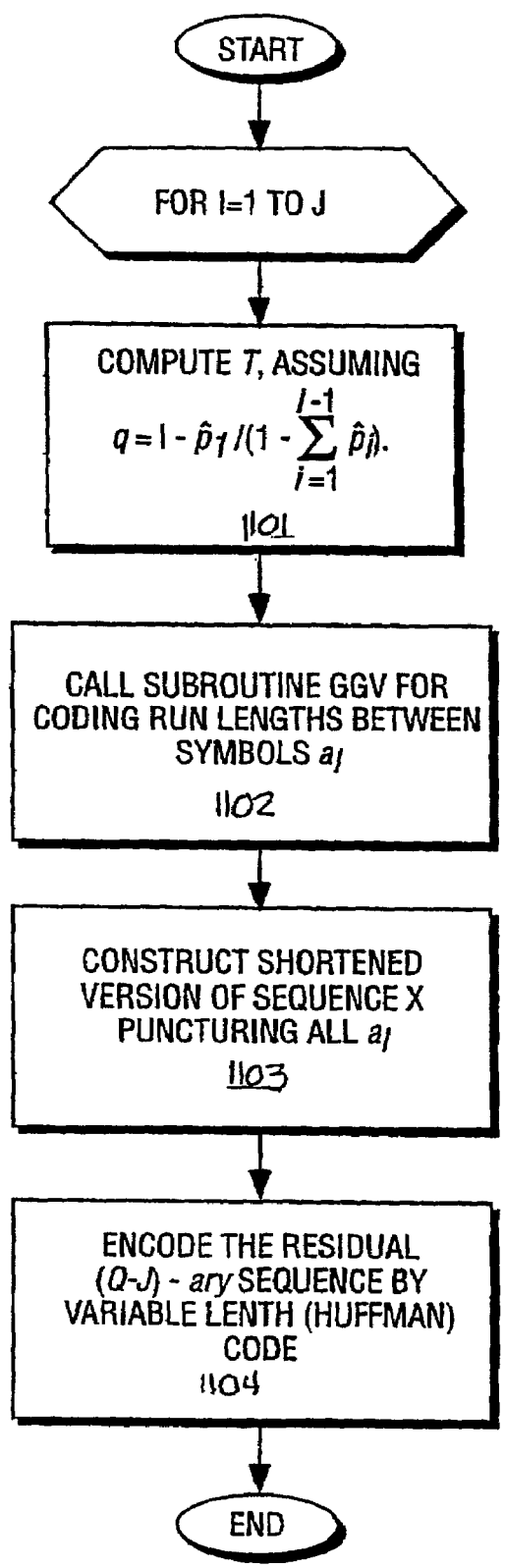
FIG. 11 is a flowchart of the QGGV coding procedure according to one embodiment of the invention.

FIG. 11 is a flowchart of the QGGV coding procedure according to one embodiment of the invention. Let $A = \{a_1, a_2, \ldots, a_Q\}$ be a source alphabet with a probability distribution $p_1^Q = (p_1, p_2, \ldots, p_Q)$. Without loss of generality we assume that letters are enumerated in decreasing order of their probabilities. To encode source sequence x for all values I from 1 to J, a unique positive integer T satisfying the inequality (2), where $$q = 1 - p_I / \left(1 - \sum_{i=1}^{I-1} p_I\right),$$

is computed in block 1101. The subroutine for coding run lengths between symbols a, by the GGV algorithm is then called in block 1102 and the shortened version of x is constructed by puncturing all $a_1$ in block 1103. The residual sequence is then encoded by a variable length code (for example, Huffman code) in block 1104. Now consider how to apply the QGGV algorithm in the case when the probability distribution $p_1^Q = (p_1, p_2, \ldots, p_Q)$ is unknown for the decoder and only a portion of the original image is processed at each time moment. In this case, global statistics can not be used since there is no access to the whole image or even a complete subband. To apply the QGGV algorithm to the current portion of subband coefficients, an estimate $\hat{p}_1^Q$ of the probability distribution $p_1^Q$ calculated on the previous already processed portion of coefficients is used. Usually probabilities of the quantized subband coefficients monotonically decrease with increasing of their absolute values. Thus, in one embodiment of the present invention first run lengths between ones are encoded by the GGV method, then run lengths between twos and so on up to J-th values are encoded.

Compression results for the 512×512 gray scale "Lena" image processed by the current invention are presented in Table 1. For the wavelet decomposition, 5-tap/3-tap biorthogonal filters were employed. Decomposition with 5 levels required 5 lines of buffering. We used uniform quantization in all the subbands and the QGGV coding scheme with J=1. For comparison in the same table, compression results obtained by wavelet-based compression algorithm presented in (I. Bocharova, V. Kolesnik, B. Kudryashov, A. Malkov, A. Marsavin, V. Simileysky and F. Taubin, "Two-dimensional hierarchical quantizing and coding for wavelet compression," ISCPAT, Sep. 14–17, 1997, San Diego, Calif., USA.) are given. We call this algorithm full memory wavelet-based (FMW) algorithm

TABLE 1

PSNR of the reconstructed image for FMW (Full Memory Wavelet) and the presented memory saving wavelet-based (MSW) algorithms

| Rate (bits/pixel) | FMW (dB) | MSW (dB) |
| --- | --- | --- |
| 0.2 | 31.7 | 31.0 |
| 0.3 | 33.2 | 32.5 |
| 0.4 | 34.0 | 33.4 |
| 0.5 | 35.0 | 33.7 |
| 0.6 | 35.7 | 34.2 |
| 1.0 | 38.5 | 37.8 |

It follows from Table 1 that the method disclosed herein has almost the same rate-distortion performance as the full memory wavelet-based algorithm using hierarchical quantization-coding.

While one embodiment is described, alternative embodiments could use any number of techniques. For example, alternative embodiments could use 7-tap/9-tap biorthogonal filters instead of 3-tap/5-tap in the wavelet decomposition. The adaptive encoder in 310 of FIG. 3 could use an arithmetic encoder instead of a Huffman encoder. The term buffer is used herein to refer to any mechanism for buffering data.

What is claimed is:

1. A method of video compression comprising:
    row by row horizontal subband filtering of video data representing part of an image; and
    row by row concurrent vertical high and vertical low pass subband filtering of the results of the horizontal subband filtering wherein less than the vertical filter length of rows of results of the horizontal subband filtering are buffered at a time, and wherein said vertical high and vertical low pass subband filtering includes:
        calculating a first result row by adding a first row of a recursion buffer to the results of multiplying a row of results from the horizontal subband filtering and a first vertical filter coefficient,
        calculating a second result row by adding the first row of the recursion buffer to the result of multiplying said row of results of the horizontal subband filtering and a second vertical filter coefficient,
        overwriting said first row of said recursion buffer with said second result row, and
        transmitting said first result row to be encoded.

2. The method of claim 1, wherein said vertical high and vertical low pass subband filtering includes using coinciding filtered components.

3. The method of claim 1, wherein at least one of the subbands resulting from said vertical high and vertical low pass filtering are further filtered.

4. The method of claim 1, wherein said vertical high and vertical low pass subband filtering further comprises:
    calculating a third result row by adding a second row of the recursion buffer to the results of multiplying the row of results from the horizontal subband filtering and a third vertical filter coefficient;

calculating a fourth result row by multiplying said row of results of the horizontal subband filtering and a fourth vertical filter coefficient; and overwriting said second row of said recursion buffer with said fourth result row.

5. The method of claim 4, further comprising:

transmitting said third result row to be further filtered.

6. The method of claim 4, wherein the first result row is a row of the vertical high pass filtering, the third result row is a row of the vertical low pass filtering, the second result row is an intermediate value of the next row of the vertical high pass filtering, and the fourth result row is an intermediate value of the next row of the vertical low pass filtering.

7. The method of claim 1, wherein the row by row vertical high and vertical low subband filtering of the results of the horizontal subband filter using a two row buffer, wherein intermediate results of the vertical high and low subband filtering are swappingly stored in the two rows.

8. The method of claim 7, further comprising:

intermittently generating complete result rows of the vertical high and vertical low subband filtering.

9. The method of claim 7, wherein said swappingly stored comprises:

storing intermediate values for result rows of the vertical high pass subband filtering in said two row buffer;

generating complete values for result rows of vertical high pass subband filtering using said intermediate values in the two row buffer; and storing intermediate values for result rows of the vertical low pass subband filtering in the two row buffer, wherein said intermediate values for result rows of vertical low pass subband filtering are based on said intermediate values for result rows of vertical high pass subband filtering.

10. A method of video compression comprising:

row by row horizontal subband filtering of video data representing part of an image; and row by row concurrent vertical high and vertical low pass subband filtering of the results of the horizontal subband filtering wherein less than the vertical filter length of rows of results of the horizontal subband filtering are buffered at a time, wherein said vertical high and vertical low pass subband filtering includes:

calculating a final value for a current row of results of the vertical low pass subband filtering based on a first row of a recursion buffer and a row of results of the horizontal subband filtering, calculating a final value for a current row of results of the vertical high pass subband filtering based on a second row of the recursion buffer and the row of results of the horizontal subband filtering, calculating an intermediate value of a next row of results of the vertical high pass subband filtering based on the row of results of the horizontal subband filtering, calculating an intermediate value of a next row of results of the vertical low pass subband filtering based on the row of results of the horizontal subband filtering and the second row of the recursion buffer, transmitting said current row of results of the vertical high pass filtering to be encoded, storing said intermediate value of the next row of results of the vertical high pass subband filtering in said first row of the recursion buffer, and storing said intermediate value of the next row of results of the vertical low pass subband filtering in said second row of the recursion buffer.

11. The method of claim 10, wherein said vertical high and vertical low pass subband filtering includes using coinciding filtered components.

12. The method of claim 10, wherein at least one of the subbands resulting from said vertical high and vertical low pass filtering are further filtered.

13. The method of claim 10, wherein the row by row vertical high and vertical low subband filtering of the results of the horizontal subband filter using a two row buffer, wherein intermediate results of the vertical high and low subband filtering are swappingly stored in the two rows.

14. The method of claim 13, further comprising:

intermittently generating complete result rows of the vertical high and vertical low subband filtering.

15. The method of claim 13, wherein said swappingly stored comprises:

storing intermediate values for result rows of the vertical high pass subband filtering in said two row buffer;

generating complete values for result rows of vertical high pass subband filtering using said intermediate values in the two row buffer; and storing intermediate values for result rows of the vertical low pass subband filtering in the two row buffer, wherein said intermediate values for result rows of vertical low pass subband filtering are based on said intermediate values for result rows of vertical high pass subband filtering.

16. A method of video compression comprising:

row by row horizontal subband filtering of video data representing part of an image; and row by row concurrent vertical high and vertical low pass subband filtering of the results of the horizontal subband filtering wherein less than the vertical filter length of rows of results of the horizontal subband filtering are buffered at a time, wherein the vertical high and vertical low pass subband filtering includes:

priming a recursion buffer, as each result row of horizontal subband filtering is generated, updating two rows of the recursion buffer based on vertical filter coefficients, the current result row of horizontal filter coefficients and at least one row of the recursion buffer, and as certain rows of the result of the horizontal subband filtering are generated, generating a result row of vertical high and vertical low pass subband filtering based on vertical coefficients, the current result row of horizontal filter coefficients, and the contents of the two rows of the recursion buffer.

17. The method of claim 16, wherein said recursion buffer is less than the length of the vertical filter.

18. The method of claim 16, wherein said priming comprises:

initializing said recursion buffer with intermediate values of the vertical high and vertical low pass subband filtering.

19. The method of claim 16, wherein the result row of vertical low pass subband filtering is further filtered.

20. The method of claim 16, wherein said vertical high and vertical low pass subband filtering includes using coinciding filtered components.

21. The method of claim 16, wherein at least one of the subbands resulting from said vertical high and vertical low pass filtering are further filtered.

22. The method of claim 16, wherein the row by row vertical high and vertical low subband filtering of the results of the horizontal subband filter using a two row buffer, wherein intermediate results of the vertical high and low subband filtering are swappingly stored in the two rows.

23. The method of claim 22, further comprising:
    intermittently generating complete result rows of the vertical high and vertical low subband filtering.

24. The method of claim 22, wherein said swappingly stored comprises:
    storing intermediate values for result rows of the vertical high pass subband filtering in said two row buffer;

generating complete values for result rows of vertical high pass subband filtering using said intermediate values in the two row buffer; and storing intermediate values for result rows of the vertical low pass subband filtering in the two row buffer, wherein said intermediate values for result rows of vertical low pass subband filtering are based on said intermediate values for result rows of vertical high pass subband filtering.

* * * * *